March 5, 1940.  L. G. SYMONS  2,192,278
MUD SCREEN
Filed March 22, 1937   6 Sheets-Sheet 1

Inventor
Loren G. Symons
by Parker & Carter
Attorneys.

March 5, 1940.   L. G. SYMONS   2,192,278
MUD SCREEN
Filed March 22, 1937   6 Sheets-Sheet 2

Inventor
Loren G. Symons
by Parker & Carter
Attorneys

March 5, 1940. L. G. SYMONS 2,192,278
MUD SCREEN
Filed March 22, 1937 6 Sheets-Sheet 4

Fig. 4.

Inventor
Loren G. Symons.
by Parker & Carter
Attorneys.

March 5, 1940.  L. G. SYMONS  2,192,278
MUD SCREEN
Filed March 22, 1937   6 Sheets-Sheet 5

Inventor
Loren G. Symons
by Parker & Carter
Attorneys.

March 5, 1940.　　　L. G. SYMONS　　　2,192,278
MUD SCREEN
Filed March 22, 1937　　　6 Sheets-Sheet 6

Inventor
Loren G. Symons
by Parker & Carter
Attorneys.

Patented Mar. 5, 1940

2,192,278

UNITED STATES PATENT OFFICE 2,192,278

MUD SCREEN

Loren G. Symons, Hollywood, Calif., assignor to Nordberg Manufacturing Company, Milwaukee, Wis., a corporation of Wisconsin Application March 22, 1937, Serial No. 132,276

10 Claims. (Cl. 209—275)

My invention relates to an improvement in screens and has for one purpose the provision of a screen for separating materials or particles of mixed sizes.

Another purpose is the provision of a screen wherein a minimum of vibration shall be transmitted to the screen base or support.

Another purpose is the provision of an improved means for mounting and tensioning the cloth or mesh of such a screen.

Another purpose is the provision of improved means for vibrating the screen frame as a whole.

Another purpose is the provision of improved unbalanced rotary means for imparting vibration to such a screen.

Another purpose is the provision of improved means for mounting or supporting the screen frame on its base.

Another purpose is the provision of improved driving means.

Another purpose is the provision of means for stabilizing the screen frame during its vibration.

Other purposes will appear from time to time in the course of the specification and claims.

I illustrate my invention more or less diagrammatically in the accompanying drawings wherein.

Like parts are indicated by like symbols throughout the specification and drawings.

Referring to the drawings, 1 generally indicates any suitable supporting surface upon which the screen may be laid, such as the floor of a mill, 2, 2 indicate side frame elements, each shown as including lower channel members 2a and upper channel members 2b. These channel members may be connected at the feed or receiving end by any suitable end members or supports, for example channels 3a, 3b. The discharge end is open. The lower channels 2a are shown as penetrated by side outlet members 4, 5 for permitting the escape of material passing through the screen. 6 indicates a deflector or inclined material receiving plate extending beneath the frame elements downwardly toward the side outlets. 7 is a deflector at the opposite side of the side outlets, and 8 is a terminal deflector underlying the end of the screen and extending outwardly toward the lower end of the screen frame. Assuming that the screen is being used as a mud screen for filtering solids out of water, the water simply flows down to the plate 6 and out through one of the lateral passages 4 or 5. Generally, one of the passages is closed by any suitable closure means not herein shown, as it is not ordinarily necessary to employ more than one aperture at a time. The solids go by the end of the screen and may be received by any suitable means, conveyor or the like. Frequently, as in the use of mud screens in the oil fields, the solids are simply flowed or delivered to a pit or sump.

Adjacent the receiving end of the base thus formed are upwardly extending side members 9 upon which are angle members or shelves 10. Mounted upon the said shelves and spanning the distance between the side frame members are a pair of channels 11, 12. Positioned upon these channels is a floor 13 which, with the side members 14, 15 forms a delivery spout for the delivery of material to be screened. 17 indicates any suitable extension delivery trough for delivering material to the spout from any suitable source. I illustrate a plurality of deflectors 18 adjustably mounted as by bolts 19 and nuts 20 for controlling the flow of material across the spout floor 13.

Figures 11, 12, 13, 14, 15:
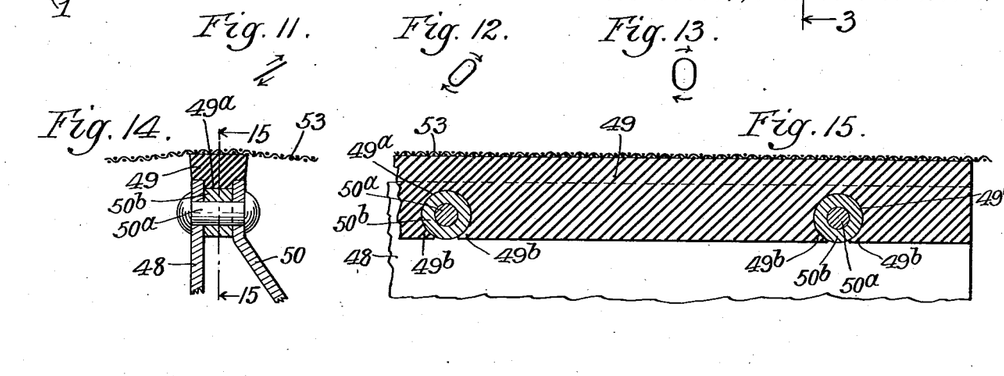
Figures 11, 12 and 13 are diagrammatic illustrations of the direction of movement of the screen, at different points along the length of the screen.
Figure 14 is a vertical longitudinal section on an enlarged scale showing the screen supporting means.
Figure 15 is a section on the line 15—15 of Figure 14.

21 indicates an angle iron extending between the side frame or base members and 22 is an additional cross member or support secured to one flange of the member 21 and spanning the distance between the side frame members 2, 2 and 9. It will be observed that the upper flange of the member 21, as at 23, is inclined upwardly. Positioned upon the upper face of the member 23 are a pair of parallel rubber strips 24, 24 which may be positioned as by welded strips or limit members 25, 26, 27. These may roughly be described as serving as a species of toggle. Positioned upon the upper faces of the strips 24 is the angle member 28 with its upwardly extending flange 29. The lower face of the member 28 is also provided with corresponding strips 25, 26 and a plate 30. The angle 28 is clamped downwardly against the flange 23 of the angle 21 by a plurality of bolts 31 headed as at 32 and provided with nuts 33. I also illustrate a longitudinally extending metal strip 34 below the lower face of the member 23 and a similar strip 35 above the upper face of the member 28. The bolts 31 pass through these strips. Positioned upon each said strip is a strip of rubber 36, 37 which is compressed against its opposed metal strip and the angle irons 28, 23 by the channel 38 and the angle 39, respectively. The channel 38 has the further function of preventing rotation of the heads 32 of the bolts 31. When the screen is vibrated, the deformation of the rubber members or toggles 24 permits or causes a vibration which is rectilinear as shown in Figure 11, and which is parallel with the top of the member 23 against which the rubber member or members 24 are compressed. Note that the bolts 31 are permitted to tilt and to permit a lateral movement of the member 28 in relation to the member 23. This is made possible because the angle 39 and the channel 38 themselves rest upon rubber members 36 and 37, compressed against the lower side of the member 23 and the upper side of the member 28, respectively.

Extending upwardly from the flange 29 and bolted thereto is a U-shaped rubber member or dam 40. It is cut away to conform to the contour of the feed spout formed by the members 13, 14 and 15 and is bolted at its edges as by the bolts 41 to the metal members or strips 42, 43. The strip 42 forms part of a U-shaped member which is clamped by the bolts 41 to a terminal flange 44 of the side member 14 or 15. The strip 43 engages a flange 44 of the side wall 45 of the screen structure which will later be described. Thus the rubber dam 40 forms a flexible connection between the feed spout formed by the walls 13, 14 and 15 and the screen structure proper which will later be described. The use of this dam makes a water tight connection between the feed spout 17 and the feed end of the screen and insures that all the liquid which is delivered from the feed spout will flow out on the screen mesh and cannot back up or escape without passing over the screen. In other words, the dam constrains all the material to pass over the screen itself and be screened.

Referring to the screen structure, the side walls 45 of relatively thin sheet metal extend from end to end of the screen. They are connected at the feed end by the already described angle 28, 29. The side walls are also provided with inwardly extending angles 47 herein shown as generally arcuate in form and upwardly arched from end to end of the screen. Mounted on these angles and extending between the side members are a plurality of transverse angles 48, the upper edges of which carry rubber pads 49 which are positioned between the upper edge of one flange of the angle 48 and an associated inclined transverse member 50 as shown for example in Figures 4 and 5. With reference, for example, to Figures 14 and 15, the cross bars 48 and 50 are permanently connected by rivets 50a surrounded by washers 50b. The rubber pad 49 is T-shaped in cross section, with the lower arm of the T notched as at 49a to conform generally to the washers 50b and partially underlies them. The member 49 can simply be rolled into place and can be removed by being rolled or stripped out of place. When it is in place, in rectilinear position, the portions 49b lock under the washers 50b and hold the strip sufficiently firmly in position to prevent unintended removal. The triangular cross section of the transverse member or strut which is formed by the members 48 and 50 gives maximum strength with minimum weight and prevents crystallization and failure. I find it advantageous to employ a flat top for the pad 49 with relatively sharp corners at the edges. These corners, particularly in connection with the generally arcuate form of the wire mesh, causes the edges of the member 49 to be pressed firmly into the mesh of the wire or the screen trough. This prevents particles from getting in between the member 49 and the mesh and wearing the rubber. Channels are also provided as at 51 which carry upwardly extending rubber pads 52, it being understood that the screen cloth or mesh 53 rests upon the pads 49 and 52 and is clamped in position thereupon as below described. Also secured to the inside face of each of the side members 45 is an inverted channel 54 into which, after the screen cloth is in position, a rubber hose or suitable flexible holding member 55 may be inserted to prevent leakage along the sides. The holding members or tubes 55 exert pressure as a result of their distortion, which pressure serves to seal the edges of the screen cloth 53 and to prevent lateral escape of liquid from the screen. Thus any liquid which passes out over the face of the screen has to escape by travel through the screen mesh.

In order to tension the screen cloth 53 at the upper edge or feed end of the screen I provide the following structure. A transverse plate 57 is welded at its rear edge as at 58. At its forward edge it rests upon the flange of an angle 59 which extends across between the side walls 45. Welded to the forward edge of the plate 57 is the angle 60 positioned to form a V-shaped trough. Overlying the plate 57 is the movable plate or clamping member 61 provided at its forward edge with an inverted V-shaped member or channel 62. 63 indicates bolts and 64 nuts whereby the plate 61 may be drawn downwardly against the plate 57 with the channel 62 penetrating the hollow of the channel 60.

Figure 5:
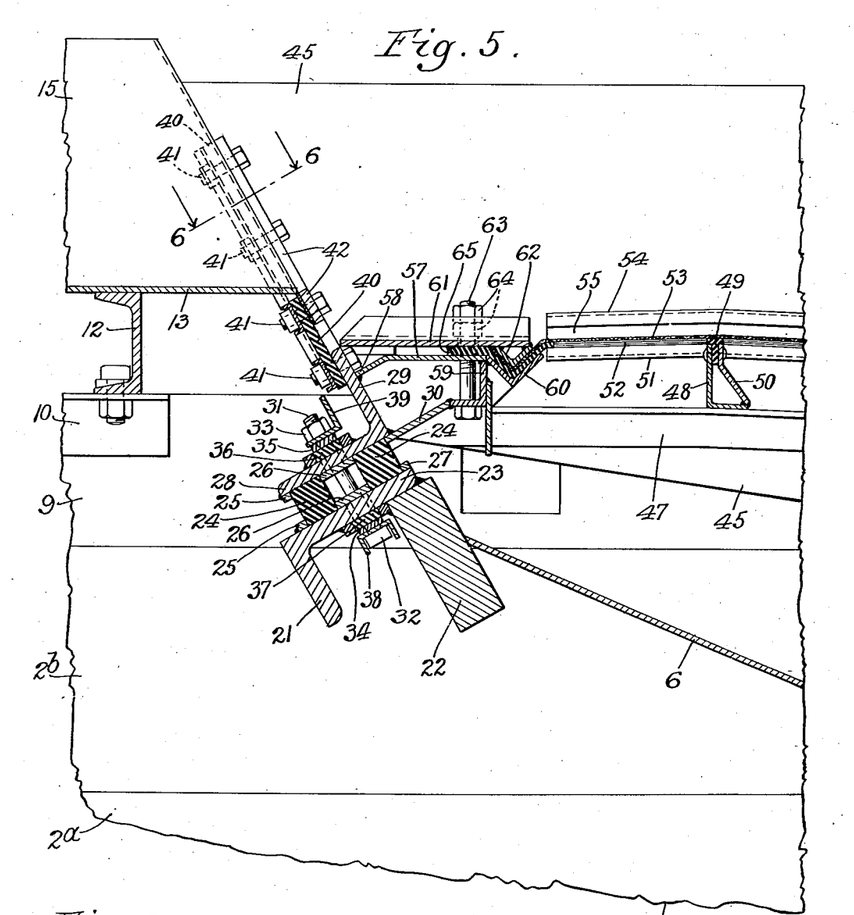
Figure 5 is a section on the line 5—5 of Figure 1, on an enlarged scale.
Figure 6:
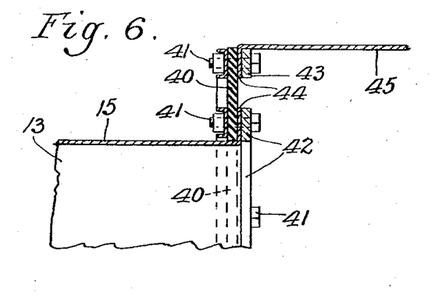
Figure 6 is a section on the line 6—6 of Figure 5.

The feed edge of the screen member 53 is provided with an underlying rubber mat 65. It may be secured in relation to the screen structure 57 by the passage through it of the bolts 63. It serves as a frictional clamping device for preventing any longitudinal movement or crawl of the edge of the member 53 and in connection with the clamping member 61 and the bolts 63 and the downward clamping movement of the member 62 puts a very firm and strong tension on the screen cloth 53. As the plate 61 is drawn down, the penetration of the member 62 into the hollow of the member 60 puts a very strong drag or tension on the screen. The position of the parts before tightening is shown in Figure 7 and the position of the parts after tightening is shown in Figure 5.

Figure 4:
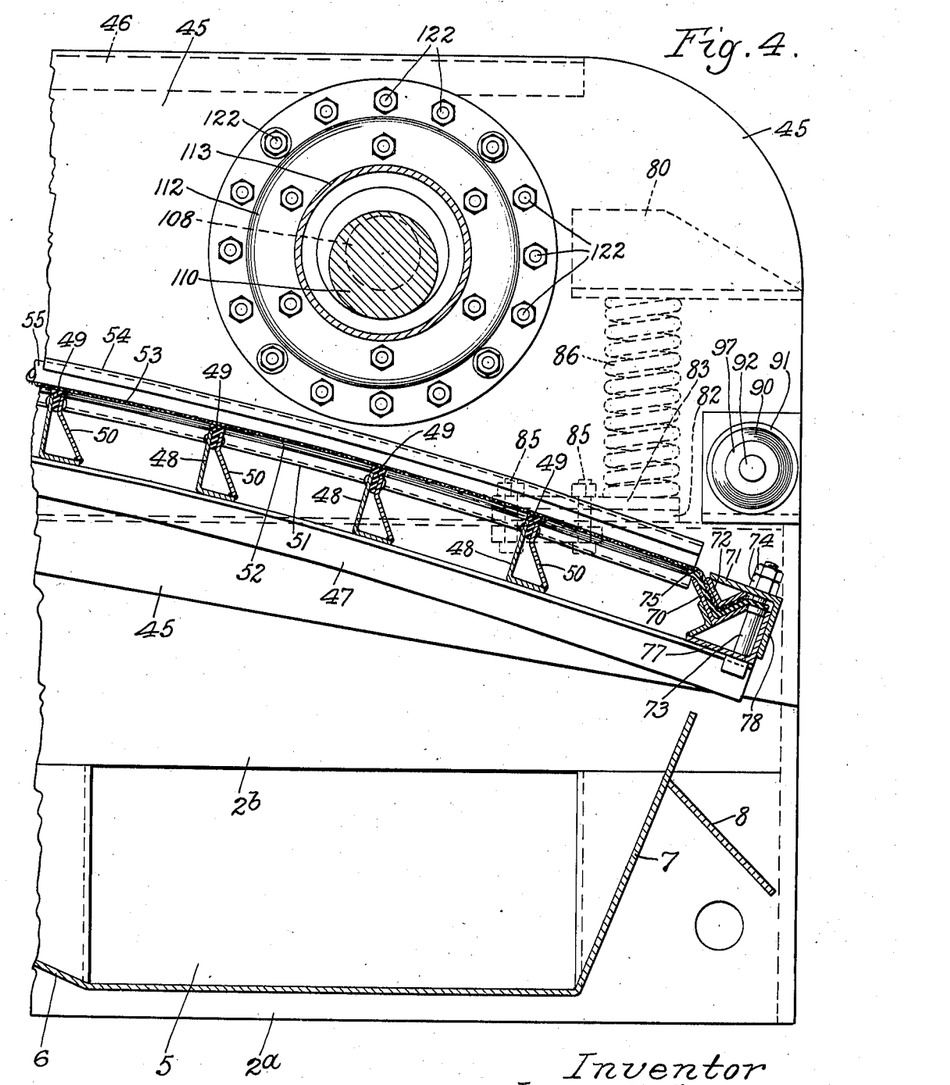
Figure 4 is a section on the line 4—4 of Figure 1, on an enlarged scale.
Figures 7, 8, 9, 10:
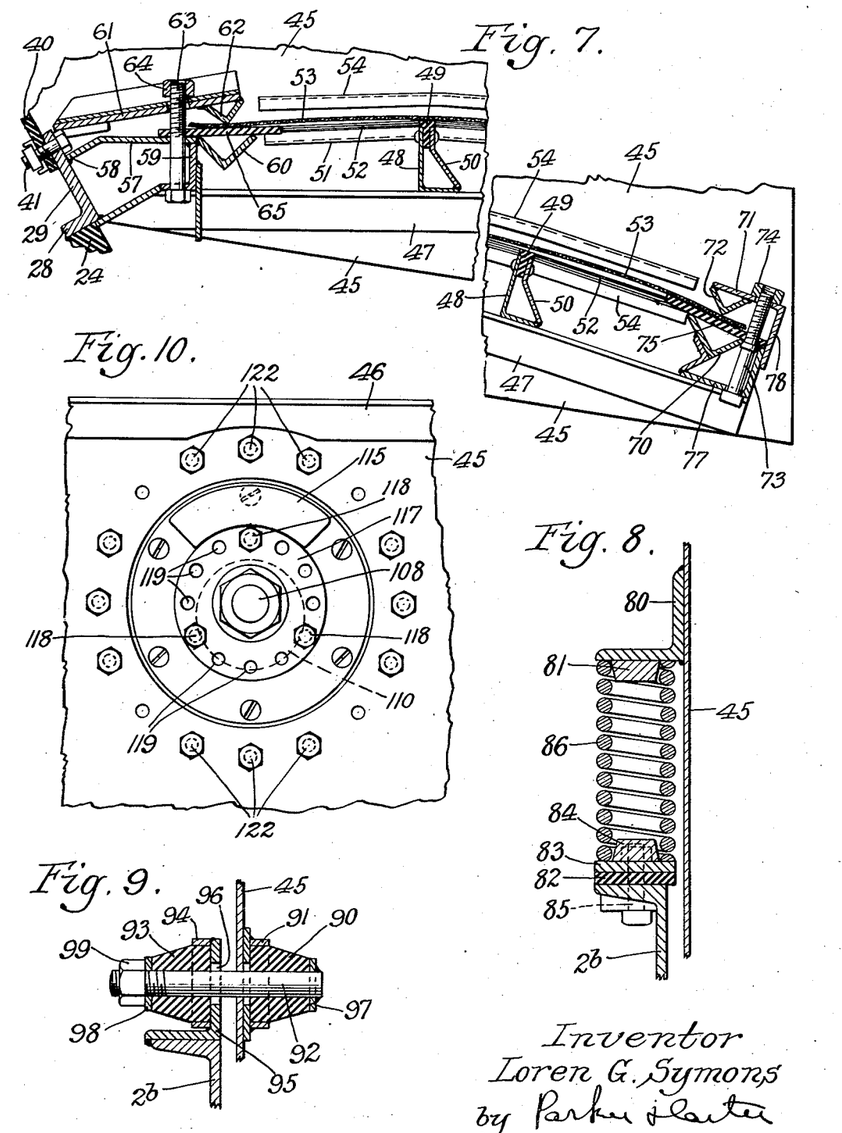
Figure 7 is a section on the line 7—7 of Figure 1, on an enlarged scale and with parts broken away, showing the screen cloth before it is stretched.
Figure 8 is a section on the line 8—8 of Figure 2 on an enlarged scale.
Figure 9 is a section on the line 9—9 of Figure 2, on an enlarged scale.
Figure 10 is a detail side elevation looking in the direction of the arrow X in Figure 3, with the cover removed.

A similar tensioning means may, if desired, be employed also at the lower edge or discharge end of the screen, as shown for example in Figures 4 and 7. I therefore show the V-shaped upwardly concave channel 70, the downwardly movable clamping member 71 with its V-shaped penetrating portion 72, the securing bolts 73 and nuts 74, and the rubber pad or mat 75. The parts are shown loose at the right of Figure 7 and locked or clamped in position at the right hand end of Figure 4. It may not be necessary to apply tension at each end of the screen cloth but in most cases I find it practical to do so. It will be noted that the bolts 73 pass through the bottom flange of the transverse angle member 77 which serves as an end frame member. The outer or end flange 78 of the member 71 slides therealong in a species of overlapping or telescoping relationship as shown in Figures 4 and 7.

When the screen cloth is thus drawn down it is arched over the plurality of pads 49 and tightly clamped thereagainst without the necessity of any superposed clamping member. As earlier described, the rubber hose 55 serves as a leakage preventing member which can be tucked into position after the screen mesh 53 is tensioned. While the screen cloth is thus very tightly held in position and very efficiently tensioned, it can be almost instantaneously removed by merely removing the members 61 and 71 at the opposite ends of the screen.

In mounting the screen unit thus described upon the frame, it will be understood that the rubber pads 24 earlier described and shown, for example in Figure 5, serve as a species of tilting or yielding connection so that although the screen is not pivoted or provided with any bushings or pivot members, it may tilt slightly as it is vibrated by the vibrating structure later described. When it does tilt or vibrate, the rubber sheet 40 also serves as a flexible connection between the upper edge of the screen frame or unit and the feed spout structure whereby there is no friction and no leakage and all the material which is fed across the floor 13 passes out upon the screen cloth 53 for screening.

In supporting the opposite or discharge end of the screen frame, I provide the following structure. Brackets or angles 80 are mounted upon or welded to the outer faces of the side members 45 and are provided with centering members or studs 81 downwardly projecting therefrom. Positioned upon the upper flange of the side frame members or channels 2b are rubber pads 82 upon which are positioned metal abutment plates 83 with upwardly extending studs 84. 85 is any suitable locking or securing bolt or bolts for holding them in position. 86 indicates a coil spring centered by the studs 81 and 84 and supporting the screen in such a fashion as to permit its ready oscillation. If necessary, a bolt may be substituted for the studs 81, 84 and may extend through the center of the spring 86.

In order to prevent side sway of the screen while permitting its vibration, I may employ the following structure. Conic rubber pads 90 are positioned against the inner face of the side members 45, being held for example by positioning rings 91 apertured to permit the passage therethrough of bolts 92. Outer rubber cones 93 are positioned by rings 94 against brackets 95 apertured as at 96 and secured to the upper flanges of the members 2b. 97 is a head on the inner end of the bolt 92 and 98 is a washer adapted to receive the thrust of the nut 99 whereby the desired degree of compression of the members 90 and 93 may be obtained. Thus ready vibration of the screen is allowed while preventing side sway of the screen and preventing any contact between the members 45 and the side frame members 2a, 2b of the base.

In order to impart vibration to the screen, I provide the following structure. A motor 100, shown as an electric motor, may be mounted on any suitable shelf or bracket 101. Its drive pulley 102 drives a driven pulley 103 through any suitable belts 104. 105 indicates any suitable bearing means for the shaft 106 upon which the pulley 103 is mounted. 107 diagrammatically indicates any suitable flexible coupling, the details of which do not of themselves form part of the present invention. 108 generally indicates a transversely extending shaft mounted in any suitable anti-frictional means such as roller bearings 109, the details of which do not form part of the present invention. 110 is an integral eccentric portion of the shaft 108. The rotation of the unbalanced shaft serves to give the desired throw or vibration to the screen structure as a whole. The flexible coupling 107 is, of course, necessary because of the relative movement of the screen structure as a whole with the shaft 108, the base including the side frame members 2a and 2b being normally fixed against movement. The employment of a flexible coupling avoids the necessity of mounting the pulley 103 directly on the screen itself. The motor 100 and the bearings 105 can be fixed in such fashion that their axes are strictly parallel. Therefore, there is no tendency to stretch the belts 104 as there is where a driven pulley is mounted directly on a vibrated screen and is connected with the driving pulley of a motor which is fixed in relation to the base of the screen. When the pulley is mounted directly on the screen, any displacement of the belts will damp the vibration of the screen. Also, the pulley itself gyrates with the full movement of the screen and gives a jerky pull on the belt. This may cause the belts to jump off and the tendency is for the operators to prevent this by tightening them to a degree that may effect the movement and efficiency of the screen. This is avoided by the employment of the bearings 105 and by the interposition of the flexible coupling between the pulley 103 and the screen proper.

Figure 3:
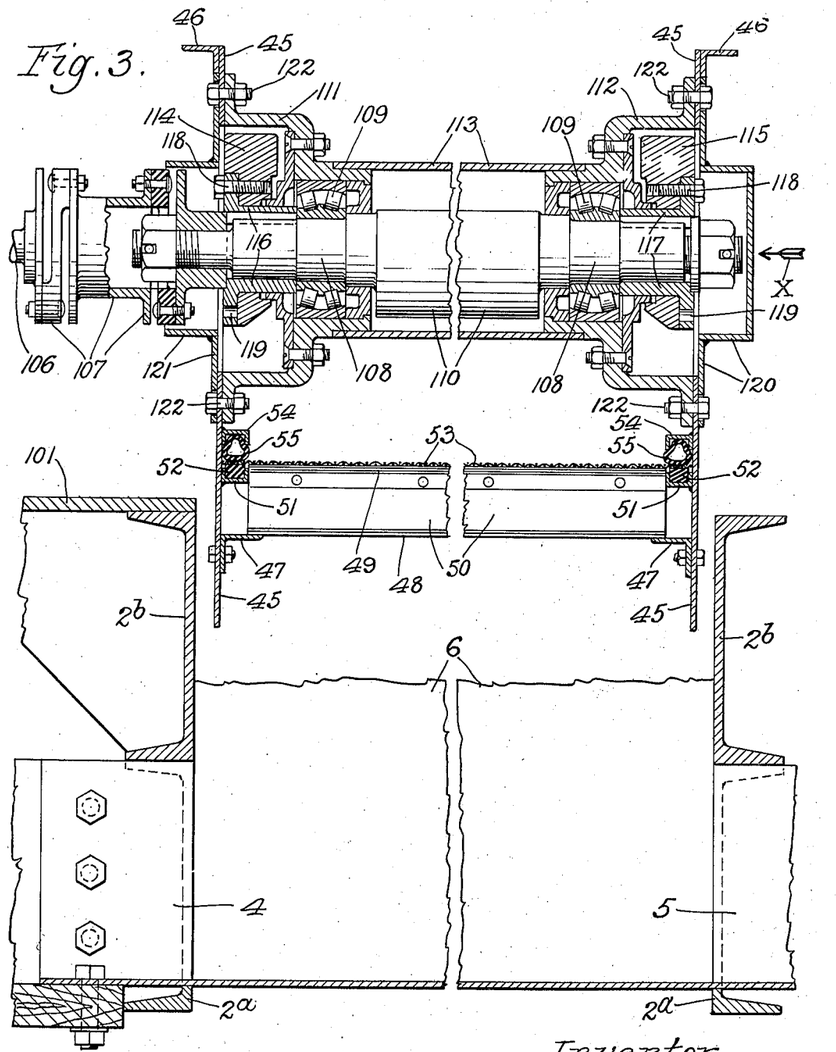
Figure 3 is a section on the line 3—3 of Figure 2.

In order to house the above described structure I provide any suitable and preferably removable bearing housing members 111 and 112 which are connected by the hollow tube or frame member 113 which houses and encloses the shaft 108, 110. In order to change the amplitude of vibration I provide adjustable weights 114, 115 housed within the members 111 and 112 and adjustable upon sleeves 116, 117 which are keyed to the ends of the shaft 108. Any suitable adjusting bolts 118 may be employed as shown in Figures 3 and 10, whereby the weights 114, 115 may be secured to the sleeves 116, 117 in different angular relationships to the portion 110 of the shaft. A plurality of holes 119 are employed to permit this adjustment, the bolts 118 being threaded through the desired apertures 119, and penetrating the weights 115, as shown in Figure 3. Any suitable outer caps or closures 120, 121 may be employed whereby access may be had to the adjusting bolts 118. I illustrate a plurality of bolts 122 for holding the housing members 111, 112 in place and a portion of these may also pass through the caps 120, 121 whereby the caps may be removed without detaching the members 111, 112 from the screen frame.

It will be realized that whereas I have described and illustrated a practical and operative device, nevertheless many changes may be made in the size, shape, number and disposition of parts without departing from the spirit of my invention. I therefore with my description and drawings to be taken as in a broad sense illustrative or diagrammatic, rather than as limiting me to the precise showing of the description and drawings.

The use and operation of my invention are as follows:

I illustrate a vibratory screen in which a normally fixed frame may be mounted or supported upon any suitable surface or support such as the floor of a mill. Upon this base or frame which includes the longitudinally extending channels 2a and 2b, I mount the screen member proper which includes the side frame members or walls 45. The feed end of the screen rests upon the rubber strips or pads 24 and it will be understood that the member 21, 23 is fixed in relation to and forms part of the base whereas the member 28, 29 is fixed to and forms part of the screen frame. The pads in effect constitute a tilting or rocking connection. The feed spout 13, 14, 15 is also fixed in relation to the base.

Inasmuch as my screen is adapted for use as a mud screen and the prevention of leakage of the material fed is desirable, I intepose the rubber member or dam 40 between the feed spout and the screen frame, in such fashion as to prevent any overflow of the material at the feed end before it passes out over the screen mesh or cloth 53. Thus in effect I have a positive support of the feed end of the screen on the base which none the less permits the desired vibration of the screen without permitting any leakage of material. The opposite end of the screen is mounted upon the vertical springs 86 and is centered by the bolts 92 and their associated rubber pads 90 and 93.

Referring to Figures 11, 12 and 13, these illustrate the movement that the cloth 53 takes from the feed end to the discharge end of the screen. At the feed end there is a gentle straight line vibration which, under heaviest load, lets most of the fluid through without strain on the cloth. At the center, as shown in Figure 12, there is less load and more movement. At the discharge end, there is a minimum load and maximum movement, which takes care of the sticky material that usually binds the cloth in mud screens.

The vibration is actually obtained by the rotation of the unbalanced member shown in Figure 3, the unbalanced shaft 110 being mounted in the transverse circular strut 113. At the discharge end, owing to the rotation of this unbalanced member and the mounting of the screen on the yielding support, the movement approximates a full circle as shown in Figure 13, in contrast to the straight line movement at the feed end, as shown in Figure 11. The vibratory or rotor structure is located adjacent the discharge end and gives the desired amplitude of movement and vibrates the entire screen. However, it is actually spaced inwardly some distance from the discharge end. The rotor structure is so located between the rubber blocks 24 at the end of the screen and the supporting springs 86 at the discharge end of the screen, that its weight tends to hold down the feed end of the screen and to prevent any tendency for the feed end of the screen to dance or climb or whip. Any tendency to side sway or lateral movement is prevented by the bolts 92, while the rubber pads 90 and 93 permit the desired vibration of the screen frame in its vertical longitudinal plane. It is highly important that the screen vibration be constrained to a plane or planes parallel with the long axis of the screen so that there will be no tendency for the material traveling along the screen to follow an inclined path toward one side or other of the screen frame. It is important that the material follow a true path parallel with the long axis of the screen in order to prevent any tendency of the screen to lateral vibration. This is insured by the employment of the centering or guiding means including the bolts 92 and the pads 90 and 93, there being one of these devices on each side of the discharge end of the screen. The screen is thereby centered and held to its proper longitudinal vibration, but the flexibility of the members 90 and 93 permits the necessary vibration of the screen in its proper plane.

A further advantage or service of this centering structure is as follows: The structure, as shown in Figure 9, presents a very small resistance to the vibration of small amplitude which is normal to the ordinary use of the screen when operated at ordinary speeds. But in starting up or stopping the screen, there is a period of slow vibration during which there is a tendency to a much greater amplitude of vibration which may be destructive. Whereas the rubber elements 90 and 93 present little resistance to the ordinary vibration of small amplitude and rapid rate, they present a great deal of resistance to vibrations of lower rate and larger amplitude, and are efficient damping means for holding down the amplitude of vibration of the screen during the stopping and the starting periods.

The tensioning means described, including the clamps 61 and 71, and the associated rubber pads are sufficient to cause the rubber members 65, 75 which underlie the ends of the screen to pull the screen cloth outwardly toward the screen ends. The parts are so proportioned that it is impossible to pull the cloth taut enough to break the wires in the cloth, but the tension is sufficient to prevent any sagging or bagging between supports. No special fastenings of any kind are required and since the locking or clamping bolts 63 and 73 pass through holes in the rubber all that is necessary in applying a new screen cloth is to cut a stretch to the proper length and then lay it in place and tighten up the bolts. In order to hold down the edges of the screen and to prevent liquid from running down the sides or over the rubber pads 52, I provide the inverted channels 54 and the rubber hose 55 which serve as leakage preventing means.

In connection with tightening screen cloth and with removing worn screen cloth and adding fresh screen cloth, the operator needs merely to cut the screen cloth or mesh to the proper length. No special treatment of either end is necessary and no clamping or finishing elements. The mesh when cut to proper length is laid upon the supports 49 with its edges stopping just short of the bolts 63 and 73 and resting on the rubber sheets 65 and 75. These sheets are perforated and threaded upon the bolts 73 and 63 so that their outer edges are held. Their inner edges and the rest of their length are free to crawl or conform to the members 60 and 70 against which they are thrust. When the wedges 62 and 72 are moved downwardly against the edges of the mesh in response to tightening of the nuts 64, 74, the result is to bend or flex the rubber sheets 65 and 75 and also the overlying portion of the wire mesh. This bending causes a relatively light frictional locking and tensioning effect and the screen begins to be drawn out into tension.

As the members 62 and 72 are moved further down toward the locking position, this locking or gripping effect becomes increasingly great and finally is great enough to put a very strong tension upon the mesh, a tension sufficient for screening purposes and sufficient to hold the mesh thoroughly tight. The fact that the screen cloth 53, with the rubbers 65, 75, is bent in a V around the lower edge of the members 62, 72 increases the frictional locking effect progressively as the members 62 and 72 are downwardly drawn toward full locking position. However, since the mesh is not actually gripped by any positive metal to metal clamping means, it cannot be broken because the individual wires of the mesh are strong enough to draw or slip around the horn or lower edge of the members 62 and 72 sufficiently to prevent breakage. In other words, I have provided an automatic tensioning device which is sufficiently powerful to put any desired tension on the mesh but which is not strong enough to break the individual strands of the mesh or to tear the mesh. This does away with the human element of breaking cloth by undue tightening which is so common with other types of screen.

In the use of this device as a mud screen, since liquid predominates at the feed end of the screen, it is important to have a relatively gentle movement at the feed end with a progressively more violent movement from the feed to the discharge end of the screen. In practice, the mud or liquid flows over the feed end and the liquid rapidly passes through the screen and is removed and the material on the screen becomes progressively drier as it passes down the length of the screen. That is to say, the chips and solids which remain are dried and passed down the screen and are subjected to an increasingly violent vibratory screening movement. This progressively more violent vibration is important because the material gets progressively more sticky as the lighter liquids drain through the feed end of the screen and an increasingly violent screening movement is necessary in order to keep the screen from blinding and cause it to perform its proper screening function. The result is to drive the thicker mud through the cloth and to do an effective job with a minimum of blinding, which in practice enables this screen to do in the neighborhood of twice as much work or to have a capacity about twice as great as competing screens.

Figure 1:
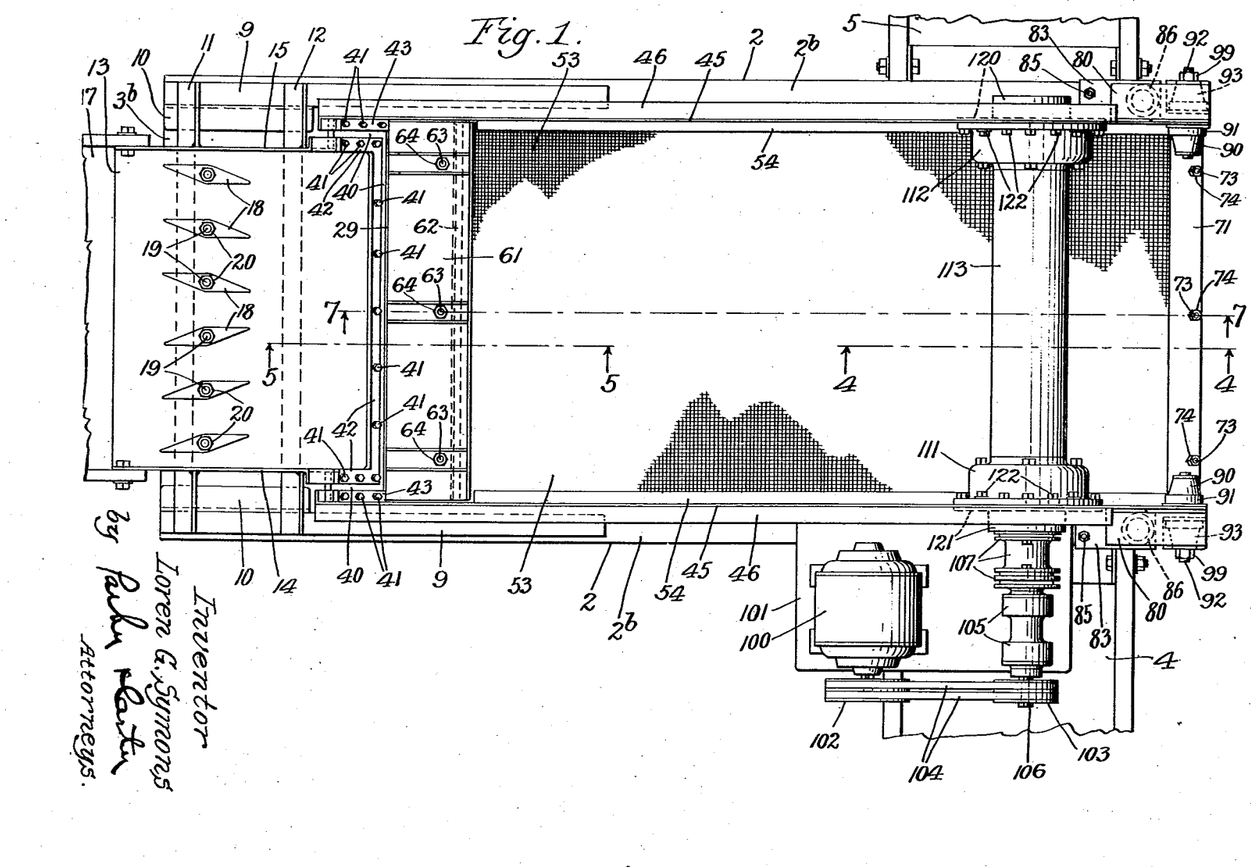
Figure 1 is a plan view.
Figure 2:
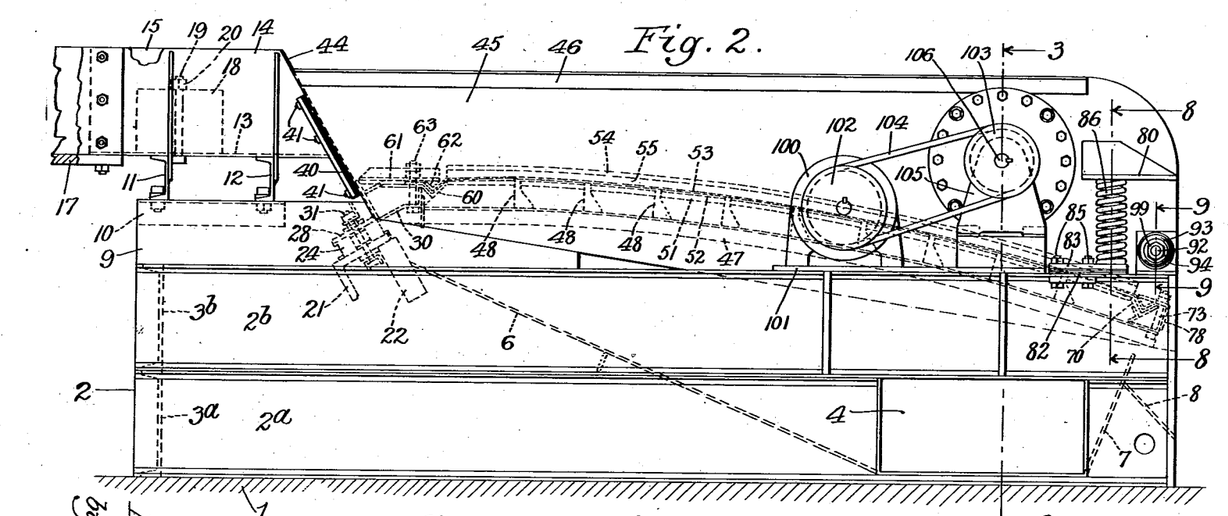
Figure 2 is a side elevation.

Whereas throughout the application I have shown and emphasized a screen structure in which a generally arcuate screen surface is employed, the mesh 53 being so stretched over the transverse supports 49 as to form in general an arc as shown in Figure 2, it will be understood that I may employ such an arc in connection with a substantially extending generally flat portion, the arc beginning intermediate the ends of the screen. I may employ the arc or an inclined flat section, so that an abrupt change in slope or inclination occurs intermediate the ends of the screen. As one example of such a change in slope, I may start my arc or sloping or inclined portion, say one-third or forty per cent of the length of the screen from the feed end of the screen frame. This change in inclination may be useful in connection with the variation in type of vibratory movement from end to end of the screen.

Referring for example to Figures 11, 12 and 13, I find it under some circumstances useful to subject the material to linear movement on a generally flat portion adjacent the feed end of the screen, the linear movement, as shown in Figure 11, tending to impart a forward conveying movement to the material on the flat portion. I also in such case find it useful to have the major slope take place toward the discharge end in connection with the more oval or rotary vibration shown in Figure 13. The curve or slope may be changed or graduated or varied depending upon the material being screened. This may be done in order to cause the material to be conveyed from the feed end to the discharge end uniformly and in a layer of a thickness desirable for the particular screening or material being handled.

Referring to the form of Figure 2, the material advances at the feed end primarily because of the nature of the screening movement and it advances toward the discharge end in substantial part because of the increasing slope. It will be understood that the particular form and slope shown in Figure 2 are illustrative and diagrammatic rather than intended as a limitation of my screening structure to the particular slope and arrangement therein shown.

It will be also understood that under some circumstances I may wish entirely to reverse the movement of the screen and have the conveying movement of Figure 11 take place at the discharge end of the screen with the more oval vibration taking place at the feed end of the screen. In such an instance, I may locate the vibrating means at the feed end of the device and maintain the linear vibration of the screen at the discharge end. This would involve reversing the relative location of the pads 24 and the supporting springs 86. In that event, I may employ a heavy slope at the feed end of the screen and a horizontal or even slightly upwardly inclined cloth or screen member at the discharge end.

I claim:

1. In a vibratory screen, a base, a screen frame mounted on said base, a connection between one end only of said screen frame and base including a transversely extending member on said base, an opposed transversely extending member on said frame, a flexible pad interposed between said members, and means for clamping said members against opposite sides of said flexible pad including clamping members extending through said members, cushion means interposed between said locking members and the faces of said members opposite to said flexible pad, and supporting means for the opposite end of the screen adapted to allow a substantially more ample vibration than the above described connection.

2. In a screen, a base, a screen frame mounted on said base, supporting means for one end of said screen frame, including a pad of yielding compressible material interposed between screen and base, said pad and the opposed parts of screen and base having generally parallel faces inclined to the horizontal, means for clamping said pad between opposed parts of said screen and base and for thereby constraining said end of the screen frame to a generally rectilinear vibration along a path inclined to the horizontal, additional means for supporting the opposite end of said screen frame, said means being adapted to permit curvilinear vibration, means for vibrating said screen frame, including a rotor mounted on the end of the screen frame opposite said pad and means for rotating it, a feed spout normally fixed in relation to the base, said screen frame including upstanding walls, and a dam of flexible material connecting said screen frame walls and spout, said flexible dam lying in a plane generally perpendicular to the plane of the contacting faces between said pad and the opposed parts of said screen and base.

3. In a screen, a base, a screen frame mounted on said base, supporting means for one end of said screen frame, including a pad of yielding compressible material interposed between screen and base, said pad and the opposed parts of screen and base having generally parallel faces inclined to the horizontal, means for clamping said pad between opposed parts of said screen and base and for thereby constraining said end of the screen frame to a generally rectilinear vibration along a path inclined to the horizontal, additional means for supporting the opposite end of said screen frame, said means being adapted to permit curvilinear vibration, means for vibrating said screen frame, including a rotor mounted on the end of the screen frame opposite said pad and means for rotating it, a feed spout normally fixed in relation to the base, said screen frame including upstanding walls, and a dam of flexible material connecting said screen frame walls and spout, said flexible dam lying in a plane generally perpendicular to the plane of the contacting faces between said pad and the opposed parts of said screen and base and intersecting said faces.

4. In a supporting connection for a screen deck, a transversely extending base member, and an opposed transversely extending screen member, said members having opposed parallel faces inclined in relation to the horizontal, supporting means of flexible compressible material interposed between said parallel surfaces, and compression means adapted to maintain said flexible compressible supporting means under predetermined compression, and to prevent separation of said opposed members, while permitting generally parallel movement of said screen member in relation to said base member.

5. In a supporting connection for a screen deck, a transversely extending base member, and an opposed transversely extending screen member, said members having opposed parallel faces inclined in relation to the horizontal, supporting means of flexible compressible material interposed between said parallel surfaces, and compression means adapted to maintain said flexible compressible supporting means under predetermined compression, and to prevent separation of said opposed members, while permitting generally parallel movement of said screen member in relation to said base member, said compression means including bolts passing through said base and screen member, and compressible cushion means interposed between the ends of said bolts and the faces of said base and screen members opposite to said first mentioned supporting means of flexible compressible material.

6. In a screen, a base, a screen deck, and a supporting connection between one end of said deck and said base, adapted to permit simultaneously a linear vibration of said end of the deck and a hinging movement of the deck as a whole, including a transversely extending base member, and an opposed transversely extending screen frame member, said members having opposed parallel faces inclined in relation to the horizontal, supporting means of flexible compressible material interposed between said parallel surfaces, compression means adapted to maintain said flexible compressible supporting means under predetermined compression and to prevent separation of said opposed members, while permitting a generally parallel movement of said screen member in relation to said base member, means for vibrating the deck, including an unbalanced rotor mounted on said deck and means for rotating it, and additional supporting means for the opposite end of the deck, said additional supporting means being adapted, in response to rotation of said unbalanced rotor, to constrain the opposite end of the deck to an orbital vibration having a substantially greater vertical component than the first mentioned end of the deck.

7. In a screen, a base, a screen frame mounted on said base, and a supporting connection between said screen frame and base, including a transversely extending base member, and an opposed transversely extending screen member, said members having opposed parallel faces, supporting means of flexible compressible material interposed between said parallel surfaces, and compression means adapted to maintain said flexible compressible supporting means under predetermined compression and to prevent separation of said opposed members, while permitting a generally parallel movement of said screen member in relation to said base member, a feed spout normally fixed in relation to the base, said screen frame including upstanding walls, and a dam of flexible material connecting said screen frame walls and spout, said flexible dam lying in a plane generally perpendicular to the plane of the contacting faces of said opposed members of screen and base.

8. In a screen, a base, a screen frame mounted on said base, and a supporting connection between said screen frame and base, including a transversely extending base member, and an opposed transversely extending screen member, said members having opposed parallel faces, supporting means of flexible compressible material interposed between said parallel surfaces, and compression means adapted to maintain said flexible compressible supporting means under predetermined compression, and to prevent separation of said opposed members, while permitting a generally parallel movement of said screen member in relation to said base member, a feed spout normally fixed in relation to the base, said screen frame including upstanding walls, and a dam of flexible material connecting said screen frame walls and spout, said flexible dam lying in a plane generally perpendicular to the plane of the contacting faces of said opposed members of screen and base and intersecting their opposed faces.

9. In a supporting connection for a screen deck, a transversely extending base member, and an opposed transversely extending screen member, said members having opposed parallel faces inclined in relation to the horizontal, supporting means interposed between said parallel surfaces and including members of flexible compressible material having portions located adjacent the inclined parallel faces of said transversely extending base member and screen member, and compression means adapted to maintain said members under predetermined compression, and to prevent separation of said opposed base and screen members, while permitting a generally parallel movement of said screen member in relation to said base member.

10. In a supporting connection for a screen deck, a transversely extending base member, and an opposed transversely extending screen member, said members having opposed parallel faces inclined in relation to the horizontal, supporting means interposed between said parallel surfaces and including members of flexible compressible material having portions located adjacent the inclined parallel faces of said transversely extending base member and screen member, and compression means adapted to maintain said members under predetermined compression, and to prevent separation of said opposed base and screen members, while permitting a generally parallel movement of said screen member in relation to said base member, means for vibrating the deck, including an unbalanced rotor mounted on said deck and means for rotating it, and additional supporting means for the opposite end of the deck, said additional supporting means being adapted, in response to rotation of said unbalanced rotor, to constrain the opposite end of the deck to an orbital vibration having a substantially greater vertical component than the first mentioned end of the deck.

LOREN G. SYMONS.